P. PRETTYMAN.
Railway Car Truck.

No. 95,043. Patented Sept. 21, 1869.

Witnesses

Inventor
P. Prettyman
per
Attorneys

United States Patent Office.

PERRY PRETTYMAN, OF PARADISE SPRING FARM, OREGON.

Letters Patent No. 95,043, dated September 21, 1869.

IMPROVED RAILWAY-CAR TRUCK.

The Schedule referred to in these Letters Patent and making part of the same.

*To all whom it may concern:*

Be it known that I, PERRY PRETTYMAN, of Paradise Spring Farm, in the county of Multnomah, and State of Oregon, have invented a new and useful Improvement in Railroad-Cars; and I do hereby declare that the following is a full, clear, and exact description thereof, which will enable others skilled in the art to make and use the same, reference being had to the accompanying drawings, forming part of this specification.

This invention relates to improvements in railroad-cars, the object of which is to prevent them from running or being thrown off the track from any cause.

It consists in the application, to the car-trucks, of auxiliary axles and wheels, so arranged that the said wheels will be suspended between an inward-projecting portion or flange of the top of the rail and a corresponding widened portion of the bottom of the rail, of such rails as form the subject of an application by me for Letters Patent, bearing even date herewith, the upper flange of the said rail serving, by its action on the auxiliary wheels, to hold the cars from running off, and the lower flange serving for the track of the said auxiliary wheels, which receive and support the cars if the main axles break.

Similar letters of reference indicate like parts.

A represents the truck of an ordinary car, resting on the wheels B, as commonly constructed, except that for greater safety I prefer to make the flanges deeper than they are commonly made.

Figure 1:
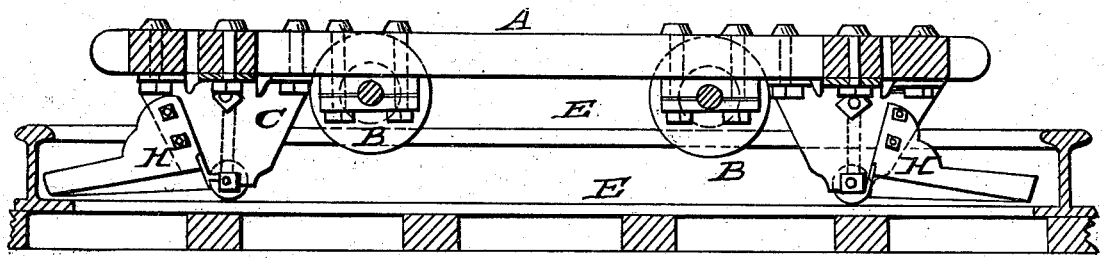
Figure 1 represents a longitudinal sectional elevation of a car having my improvements.
Figure 2:
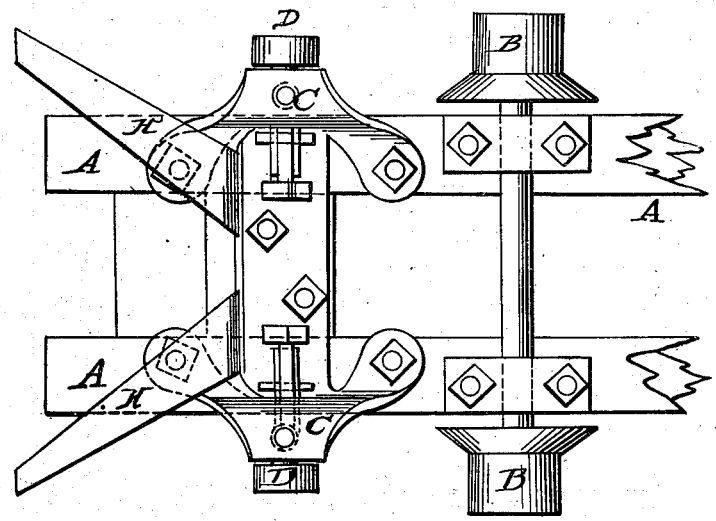
Figure 2 represents a plan of the bottom of the same.
Figure 3:
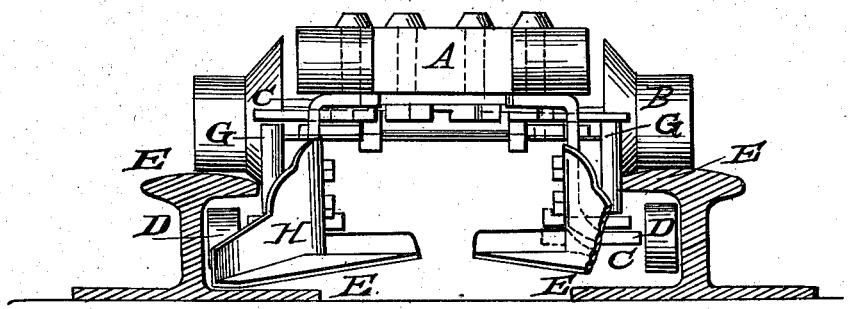
Figure 3 represents an end view of the same.

C represents auxiliary axles, secured to the bottom of the truck, and bent into the form represented in fig. 3, the lower termination of which forms journals for the auxiliary wheels D, supporting them between the upper and lower inward-projecting flanges E E of the rails.

G represents vertical projecting guard-rollers, for the purpose of so limiting the lateral movement of the cars as to prevent the sides of the wheels D striking against the vertical inner face of the rails.

The said guard-rollers may be supported in any suitable manner, either in brackets secured to the car-truck, or to the auxiliary axles C, and the form and arrangement of the axles C may be any that may be found best adapted.

It will be seen that by this arrangement the liability of the cars to run off the track will be very greatly reduced, if not wholly avoided, and in the case of the breakage of an axle or wheel, the cars will be supported, and may continue in motion on the said auxiliary wheels, which will run on the flanges E as a rail.

H represents track-cleaning chutes, which I propose to arrange in front of the said auxiliary wheels, for the purpose of removing obstructions that may accumulate in their track.

Having thus described my invention,

I claim as new, and desire to secure by Letters Patent—

1. The arrangement of the wheels D upon axles attached to each side of the car-truck, in the position and for the purpose specified.

2. The arrangement of the guard-rollers G upon the truck, at the points specified, for the purpose of limiting the lateral movement of the car.

3. The combination, with the auxiliary wheels D, of the chute H, substantially as and for the purpose described.

The above specification of my invention signed by me, this 20th day of October, 1868.

PERRY PRETTYMAN.

Witnesses:
J. L. ATKINSON,
L. M. PARRISH.